United States Patent
Refai

(10) Patent No.: US 7,020,103 B1
(45) Date of Patent: Mar. 28, 2006

(54) BROADBAND COMMUNICATION SYSTEM USING POINT AND SHOOT APPROACH

(75) Inventor: Wail M. Refai, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/048,686

(22) Filed: Mar. 26, 1998

(51) Int. Cl.
H04J 1/10 (2006.01)

(52) U.S. Cl. .................................................... 370/315

(58) Field of Classification Search ........ 370/312–317, 370/319, 321, 326, 522, 524; 455/4.1, 4.2, 455/51, 6.1, 6.2, 6.3, 3.1; 348/6.17; 725/120, 725/119, 127, 129, 149, 100, 131, 139, 151
See application file for complete search history.

(56) References Cited

U.S. PATENT DOCUMENTS

| | | | |
|---|---|---|---|
| 4,381,562 A | | 4/1983 | Acampora |
| 4,829,372 A | * | 5/1989 | McCalley et al. ............ 725/99 |
| 4,979,170 A | * | 12/1990 | Gilhousen et al. .......... 370/522 |
| 5,347,304 A | | 9/1994 | Moura et al. |
| 5,689,245 A | | 11/1997 | Noreen et al. |
| 5,708,961 A | * | 1/1998 | Hylton et al. ................ 455/4.2 |
| 5,914,947 A | * | 6/1999 | Saito ........................... 370/337 |
| 6,041,124 A | * | 3/2000 | Sugita ......................... 380/270 |
| 6,850,252 B1 | * | 2/2005 | Hoffberg .................... 715/716 |
| 2005/0169255 A1 | * | 8/2005 | Shimomura et al. ........ 370/352 |

* cited by examiner

Primary Examiner—Dang Ton
(74) Attorney, Agent, or Firm—Coats & Bennett, P.L.L.C.

(57) ABSTRACT

A broadband communication network uses a point and shoot approach for data transmission. A broadband information signal is transmitted from a transmitting station to a receiving station. The information signal is divided into a series of data packets, each including addressing information and data intended for a particular receiver. The information signal is parsed to extract addressing information. The addressing information parsed from the information signal is used to construct a narrow band index signal. The narrow band index signal is transmitted, along with the broadband information signal, to a plurality of receiving stations. Each receiving station demodulates and decodes the narrow band index signal. The address information contained in the index field includes pointers to data packets in the information signal. Using the addressing information and pointers in the index signal, each receiving station can locate and extract data packets from the broadband information signal which are intended for that particular receiver. The data packets from the information signal are buffered to permit demodulation and decoding the particular packet(s) belong to that particular receiver at the same rate of the information signals.

26 Claims, 5 Drawing Sheets

BROADBAND COMMUNICATION SYSTEM USING POINT AND SHOOT APPROACH

FIELD OF THE INVENTION

The present invention relates to broadband communication networks, and more particularly to a multi-channel access scheme for providing shared access to a broadband carrier.

BACKGROUND OF THE INVENTION

The need for telecommunication networks capable of providing diverse and emerging communication services such as data, voice, and video motivated the development of broadband networks. Such networks offer users multimedia services, and the flexibility of accessing bandwidth on demand. Furthermore, there is increasing recognition of the benefits and advantages of using satellite transmission systems which will no doubt play a significant role in establishing a communications infrastructure for broadband communications.

The use of multimedia broadband applications in the Ka band (30/20 GHz) for satellite communication systems raises the problem of dealing with very high-speed data transmission rates, especially in the forward link segment, from satellite to the user terminals, where a broad spectrum of data is accommodated in each carrier. The main problem to overcome in a broadband communication system is how the user terminals or receivers can be made to demodulate and process the incoming high-speed data stream without requiring technology that is excessively sophisticated or expensive.

One technique that has been utilized previously to address a similar problem is an approach known as asynchronous transfer mode or ATM. ATM is based on time division multiple access (TDMA) and framing at the satellite. The satellite first buffers and then transmits the data in frames. In this approach, each frame is divided into a number of discrete time slots. Each time slot corresponds to a group of cells within the network. During each time slot, the satellite transmits to a selected group of cells. For example, if there are 7 available time slots, the cells would be divided into 7 groups. During a given time slot, the satellite would transmit data to cells in a single group. During the next time slot, the satellite would transmit to cells in a different group. This process is repeated for each frame. Therefore, during any frame, a cell would receive data in 1 time slot out of 7. By transmitting the data stream in this manner, the required data reception rates for any individual receiver within a cell can be kept at a manageable level. However, there is significant technical complexity penalty associated with the ATM approach as higher data rates are implemented.

Another approach, known as the point and shoot approach, does not involve time division or data framing at the satellite. Instead the data stream is broadcast to all associated receivers simultaneously. The signal is divided into a plurality of packets. Each packet contains addressing information identifying the intended receiver for that packet. Each receiver monitors the data stream and extracts data packets intended for that particular receiver. The primary technical challenge with this approach is designing receivers that can demodulate and process their own incoming data streams without demodulating and processing the entire broadband data stream of the information signal. Current point and shoot communication networks are capable of accommodating only relatively low data transmission/reception rates. As higher data transmission rates are required, the complexity and consequently the cost of the associated receivers needed to demodulate this high-speed data stream also increases. Since receiver products are the primary source of revenue in the satellite communications business, there is significant incentive to maintain costs of the receiver as low as possible.

Therefor, there is and continues to be a need for a practical, efficient and cost effective satellite based point and shoot type telecommunication network which is capable of conveying high-speed data streams from satellite transmitters to ground-based user terminals or receivers.

SUMMARY OF THE INVENTION

The present invention is a satellite communication system using a point and shoot approach for data transmission that is suitable for broadband communications. The communication system includes a plurality of ground-based transmitters, an orbiting transceiver satellite, and a plurality of ground-based addressable receivers. Each ground-based transmitter transmits a broadband information signal which is divided into a series of discrete data packets. The information signal is transmitted at rates varying from 2 megabits per second to 64 megabits per second depending on the type of user terminal. The information signal is received by the orbiting transceiver.

Each data packet in the information signal contains, among other information, the address of the intended receiver and the start time of the associated data. Upon receipt of the information signals, the satellite parses addressing information contained within each information signal (which is intended for a particular receiver) and uses the address information to construct an index signal. The index signal has a smaller number of bits as compared to the information signal. Each index signal, which contains address information for a specific receiver, has the same packet length as the information signal with a few bits carrying the receiver address and its information packet start time. The rest of the bits, called tail or reserve bits, are empty bits. Empty bits are used to match the index signal bit rate with the information signal bit rate.

The index signals are transmitted over a narrow band beam and the information signals are transmitted over a broadband beam from the satellite to a plurality of receivers. Each receiver continuously demodulates and decodes the narrow band index signal. The index signals are transmitted over a narrow band beam with the same bit rate as the information signals. The ground-based receivers continuously demodulate and decode the narrow band beam. The receiver, using address information contained in the index signal, locates and extracts data in the information signal intended for that receiver. When an address appears in the index signal that matches the receiver's address, the target receiver enables an onboard buffer to record or store a relevant portion of the information signal. By buffering the relevant portion of the information signal, the receiver is not required to demodulate and decode the high-speed information signal of all other receivers, but instead may perform the demodulation and decoding of only its own information from the knowledge obtained from the index signal. This means that each designated receiver expecting an information signal will only demodulate its own information signal from the stream of packets. As high-speed demodulation and decoding of data signals is technically challenging and not particularly cost effective, the benefit of such a dual signal broadcast and buffering receiver configuration can be seen in

DETAILED DESCRIPTION OF THE INVENTION

Figure 1:
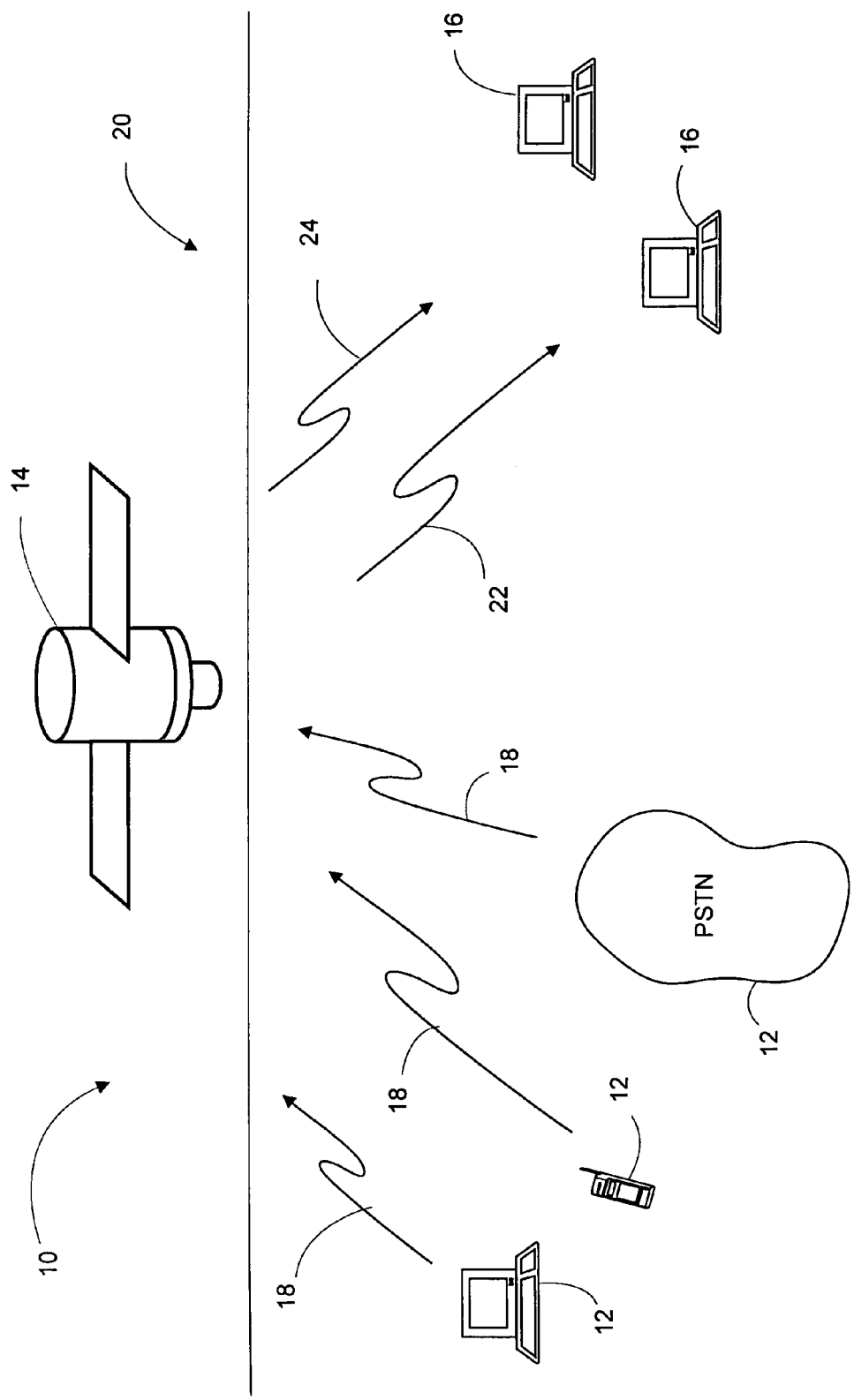
FIG. 1 is a schematic illustration of the satellite communication system of the present invention.

Shown in FIG. 1 is a functional schematic diagram that illustrates a broadband communication system generally indicated by the numeral 10. Communication system 10 comprises a plurality of ground-based transmitters 12, an orbiting satellite transceiver 14 and a plurality of ground-based user terminals or receivers 16. It should be appreciated that while the particular embodiment shown in FIG. 1 assumes that the transmitter 12 and receiver 16 are ground-based and that the transceiver 14 is spaced-based, in practice these network components could be stationed in a variety of configurations.

The ground-based transmitters 12 broadcast the information signal via uplink 18 to the transceiver 14. As shown in FIG. 1, the information signals 18 are received and re-transmitted by the orbiting satellite transceiver 14 via downlink or forward link 20 to a plurality of receivers. The downlink 20 may comprises a single carrier beam or a multi-carrier beam. In a conventional satellite communication system, the downlink 20 typically comprise a narrow band carrier with a relatively low rate of transmission in the range of 0.5 to 1.0 megabits per second (Mbps). The present invention, in contrast, employs a broadband carrier for transmitting the information signal on the downlink. The broadband carrier has a relatively high rate of data transmission typically in the range of 250 to 500 Mbps.

On the uplink 18, the information signals are organized into a series of discrete units called data packets 30. There is no framing as in time division multiple access (TDMA) schemes. Instead each data packet 30 contains addressing information that identifies the intended receiver 16 and provides locating information for locating the associated data in the information signal. That is, each data packet 30 is addressed to a particular receiver within the footprint of the broadband carrier beam.

Figure 2:
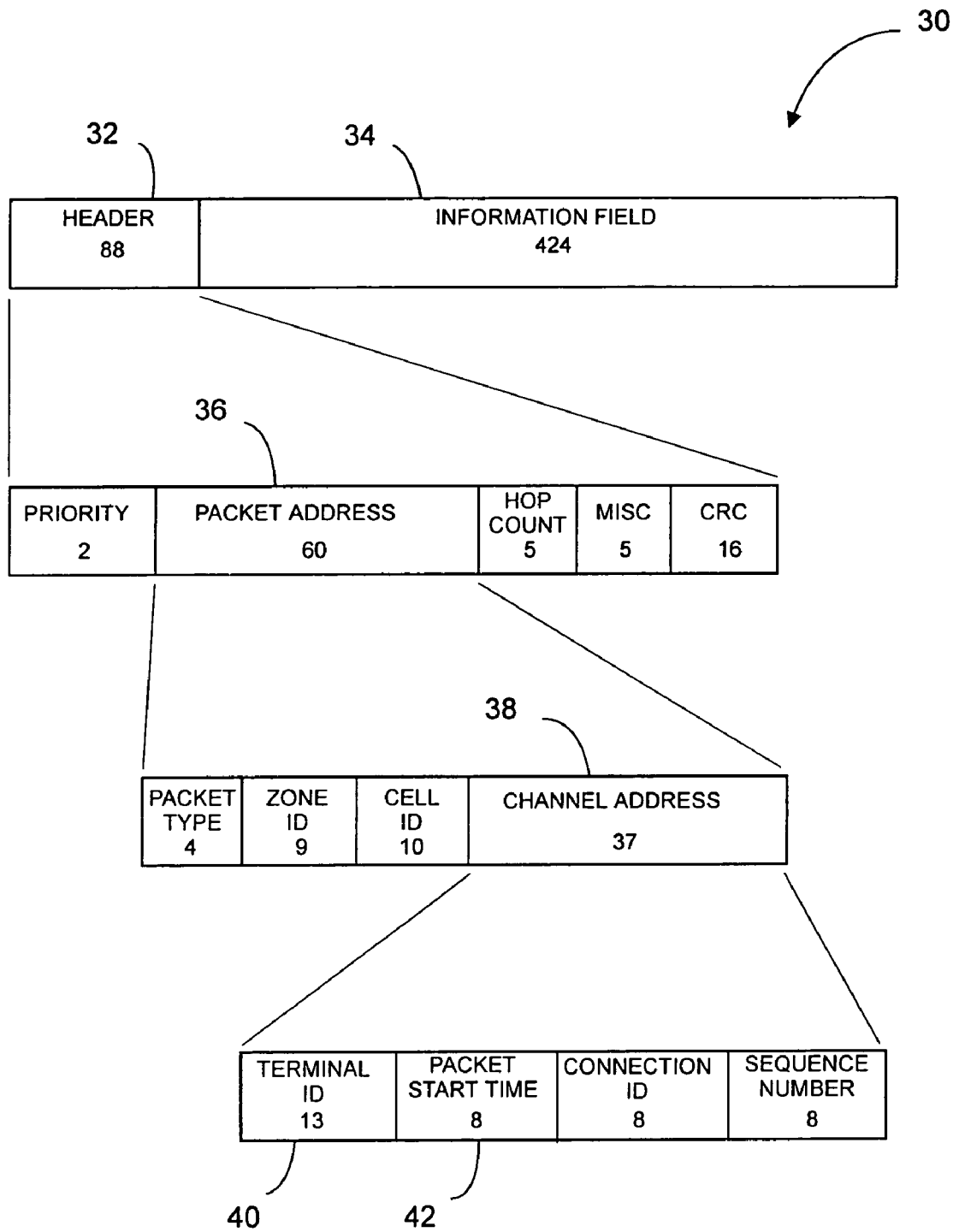
FIG. 2 is a schematic illustration of an exemplary data packet used in the satellite communication system for transmitting data in the primary data stream.

FIG. 2 illustrates the format of an exemplary data packet 30. Each data packet 30 contains a header 32 and an information field 34. The header 32 comprises the 88 bits and the information field 34 comprises 424 bits for a total of 512 bits. The header 32 contains data that is used for management and control of the communication system. The information field 34 contains the data being transmitted such as voice, audio or image data.

The header 32 is divided into a number of fields that depend on the protocol being used. The important fields for the purpose of practicing the present invention are fields containing address information. As shown in FIG. 2, the header 32 includes a packet address field 36, which in turn contains a channel address field 38. The channel address field 38 contains a terminal ID field 40 and a packet start time field 42. The terminal ID field 40 comprises 13 bits in length and contains an identifier used to identify a particular receiver 16 to which the data packet 30 is addressed. The packet start time field 42 is 8 bits in length and follows the terminal ID field 40. The packet start time field 42 contains information to identify the start time of the information field 34 that contains the data being transmitted. The remaining 67 bits of header information are further divided. However, the information that they convey is not particularly significant with regard to the present invention and hence they will not be discussed in further detail herein. It should be appreciated that the specific packet sizes and data formats specified herein are only representative of one particular communication network protocol, and that any number of packet sizes and packet formats could be employed to satisfy the requirements of a particular system application.

When the information signal is received at the transceiver 14, address information contained in the header 32 of the data packets 30 is copied and used to construct an index data stream 24. The index data stream 24 is transmitted to the receivers 16 on a narrow band carrier while the original information signal is transmitted unchanged to the receivers on a broadband carrier. Thus, the downlink comprises two data streams referred to herein as the primary data stream 22 and the index data stream 24.

Receivers 16 in the network 10 demodulate and decode the entire index data stream 24. The receiver 16, to locate and extract the corresponding data in the primary data stream 22, uses address information in the index data stream 24. Therefore the receiver does not need to demodulate and decode the entire primary data stream 22. Since, the index data stream 24 is a narrow band signal, it can be demodulated and decoded without expensive equipment.

Figure 3:
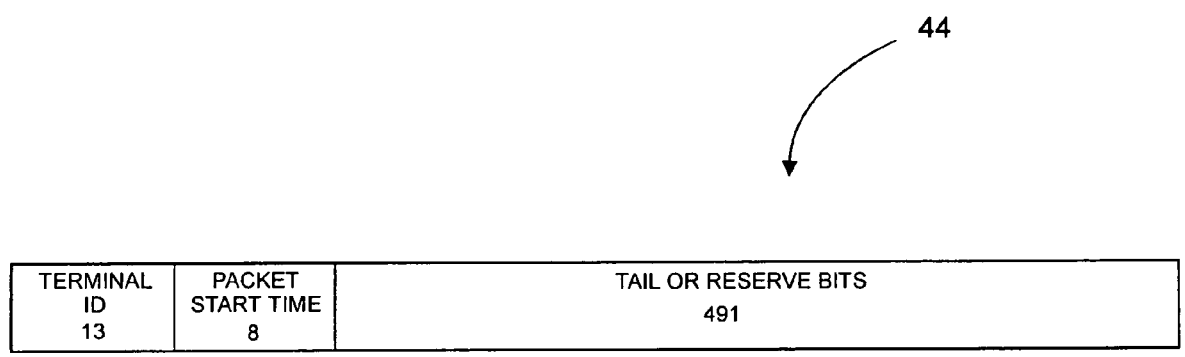
FIG. 3 is a schematic illustration of an index data packet used for transmitting address information in the index data stream.

FIG. 3 shows the data structure of the index data stream 24 in more detail. As shown in FIG. 3, the terminal ID field and packet start time field 40 and 42 in each data packet 30 in the primary data stream 22 are copied. These two fields are used to construct an index data packet 44 for the index data stream 24. One index data packet 44 is formed for each data packet 30 in the primary data stream 22. The resulting index data packet 44, which is shown in FIG. 3, is comprised of 21 data bits. The first 13 bits contain the terminal ID and the next 8 bits containing the packet start time for the corresponding data packet within the primary data stream 22. Thus, the index data stream 24 contains the information necessary for a receiver 16 to locate within the primary data stream 22 information that is addressed to or intended for that specific receiver 16.

The advantage of using two separate data streams and on the downlink 20 can be better appreciated when the relative bandwidths or data transmission rates of the two information streams are considered. For each packet 44 contained in the index data stream 24, there is a corresponding packet(s) 30 in the primary data stream 22. The same interval of time is allocated for transmission of both an index data packet 44 and a primary data packet 30. In the case of the primary data packet 30, 512 bits of data must be transmitted during the prescribed time interval, while in the case of the index data packet 44 only 21 bits of data must be transmitted in the same interval of time. Because the amount of data transmission for the index data stream is relatively low, the receiver can be built using less expensive components.

Figure 4:
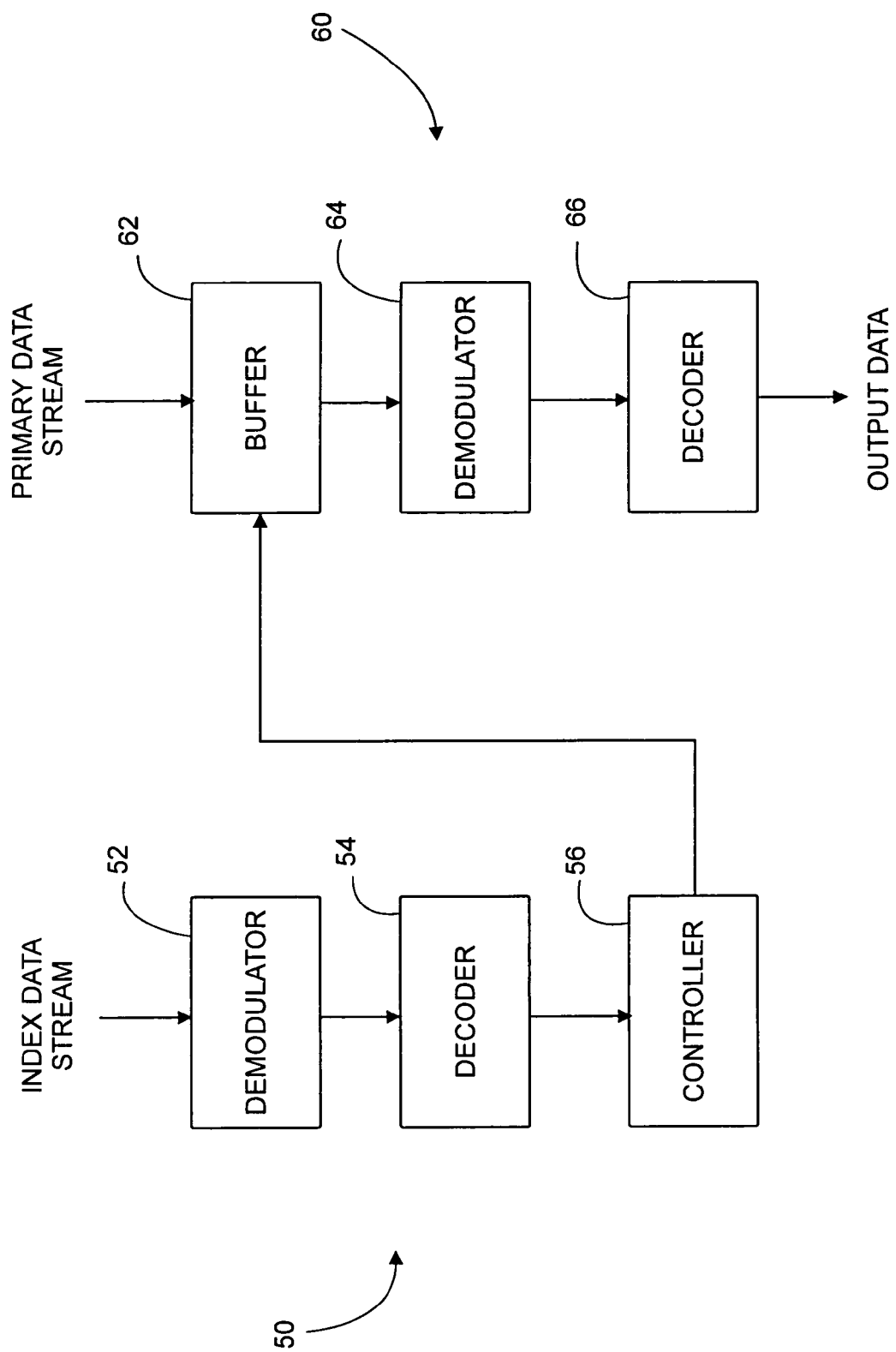
FIG. 4 is a schematic illustration of a receiver used in the satellite communication system of the present invention.

Referring now to FIG. 4, a schematic representation of a typical receiver 16 employed in the communication network 10 of the present invention is shown. Receiver 16 has two input streams 50 and 60, one for the index data stream 24 and one for the primary data stream 22. The first input stream 50 includes a demodulator 52, decoder 54, and controller 56. The second input stream 60 includes a data buffer 62, demodulator 64, and decoder 66. It will be appreciated by those skilled in the art that receivers 16 typically contain additional functional components which are necessary and required for normal operation. However, as these additional components are well known and understood, and furthermore are not particularly relevant to the present invention, they will not be discussed in detail herein.

In operation, the index signal demodulator 52 continuously receives and demodulates the incoming data stream. The decoder 54 decodes the demodulated index signal. As each individual packet of index data is demodulated and decoded, this information is passed on to the controller 56 where the terminal ID bits are compared to the receiver's identification code. Thus, the controller 56 monitors the incoming index data stream 24 for any occurrence of the receiver's identification code. It should be appreciated that such continuous, real-time demodulation/decoding and subsequent monitoring of the index data stream 24 is technically and economically feasible as a direct result of the relatively narrow bandwidth or low data transmission rate associated with the index data stream 24.

When the receiver 16 detects an index data packet 44 containing a matching terminal ID, controller 56 enables the associated buffer 62 to allow a relatively short time-slice of the incoming primary data stream 22 to be stored temporarily in the buffer 62. Typically, this time-slice corresponds to a single primary data packet 30. Information related to the start time or location of this primary data packet 30 is provided in the index data packet 44 (i.e. in the packet start time field). Thus, the buffer controller 62 in response to the packet start time or location information provided by the index data packet 44 directs the buffer 62 to grab and store a particular primary data packet 30 in the primary data stream 22. All other data packets 30 within the primary data stream 22, which are intended for other receivers 16 in the network 10, are ignored by the receiver 16. The data stored in the buffer 62 is then passed to the demodulator 64 and decoder 66 for demodulation and decoding.

It is significant and should be appreciated that the primary data stream 22 is buffered prior to demodulation and decoding. This arrangement is particularly advantageous when it is considered that the data transmission rate of the primary data stream 22 is too high (approximately 500 Mbps) to permit cost effective, real-time demodulation and decoding at the receiver 16. Precisely controlled periodic buffering of a small portion or data packet 30 of the information signal prior to demodulation and decoding allows for off-line demodulation and decoding of the broadband signal by the receiver 16 at a high rate but with relatively small amount of index data which can be easily accommodated by relatively inexpensive technology.

In practice, the index data stream 24 and the primary data stream 22 are synchronized such that a sufficient time delay is present between the appearance of a particular index data packet 44 in the index data stream 24 and the corresponding packet 30 in the primary data stream 22. This delay insures that the receiver 16 has adequate time to demodulate/decode the index data packet 44 and enable the data buffer 62.

Furthermore, it should be appreciated that the time interval between consecutive appearances of a given receiver ID in the index data stream 24 will necessarily be of duration such that the signal buffering capacity of the receiver 16 is not exceeded. Demodulating and decoding the index signals in real time allows the controller 56 to identify the terminal I.D. and the data packet(s) start time fast enough to extract the relevant information from the primary data stream. The relevant data to that particular receiver can be extracted from the buffer almost in real time. Then, demodulator 64 and decoder 66 process the relevant information almost in real time. When new data streams arrive, they will overwrite the old data stream in the buffer. This means that very fast processors are essential to avoid loss of information due to overwriting unprocessed information in the buffer. The main advantage of this approach is that each user terminal is demodulating and decoding the portion of the data packets intended for that receiver and ignore the rest of the data stream.

Figure 5A:
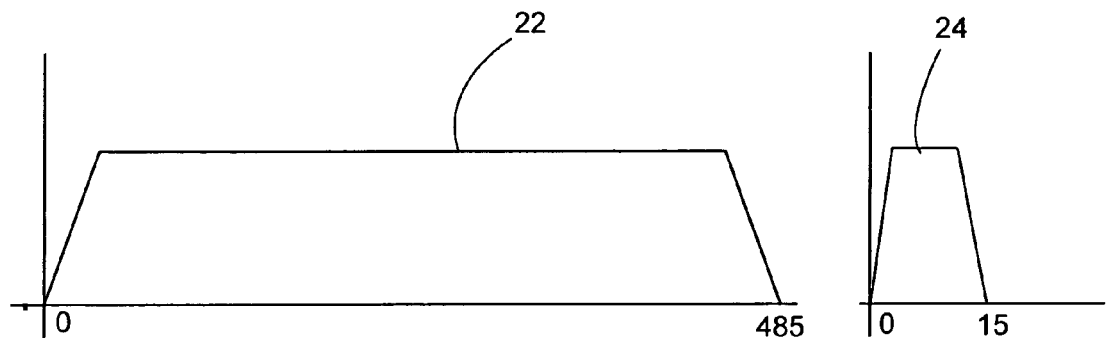
FIGS. 5A and 5B are a schematic illustration showing a frequency plan for a single carrier and multi-carrier beam used in the satellite communication system of the present invention.
Figure 5B:
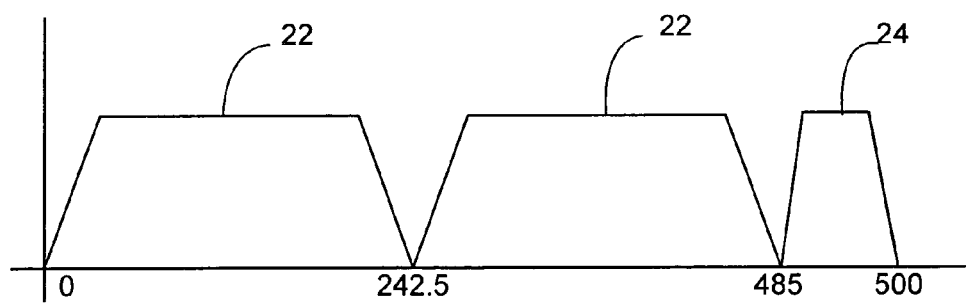

As previously indicated, the present invention can be implemented using either single carrier beams or multi-carrier beams. Referring now to FIGS. 5A and 5B, the frequency allocation for the forward link is shown for both single carrier beams and multi-carrier beams. FIG. 5A shows how the present invention can be implemented using a broadband carrier beam 22 and a narrow band carrier beam 24. The broadband carrier beam 22 has a bandwidth of approximately 485 MHz while the narrow band carrier beam 24 has a bandwidth of approximately 15 MHz. The information signal or primary data stream 22 is transmitted to the receivers 16 on the broadband carrier beam 22. The index data stream 24 is transmitted to the receivers 16 on the narrow band carrier beam. Both the narrow band and broadband beams must have the same antenna aperture so that the same receivers 16 are covered.

A multi-carrier beam configuration is shown in FIG. 5B. The beam is divided into two broadband carriers 22 and one narrow band carrier 24. The broadband carriers 22 have a bandwidth of approximately 242.5 MHz each while the narrow band carrier had a bandwidth of approximately 15 MHz. In this scenario, the index data stream 24 on the narrow band carrier 24 is used to transmit addresses of all the packets in both broadband carriers 22.

It should be apparent from the above discussions that communication network of the present invention effectively permits the transmission and reception of information at very high data transmission rates, without the need for costly and technically sophisticated receivers.

What is claimed is:

1. A method of transmitting data in a digital communication system including a transmitting station, a relay station, and a plurality of receivers, said method comprising:
   transmitting from said transmitting station to said relay station a primary data signal containing a plurality of primary data packets, each said primary data packet intended for a specific one of said receivers;
   transmitting from said relay station said primary data signal over a broadband channel to said plurality of receivers;
   transmitting an index signal over a narrow band channel from said relay station to said plurality of receivers, wherein said index signal comprises a plurality of index data packets, each said index data packet corresponding to a respective one of said primary data packets and containing address information addressing a specific one of said receivers, said index signal extracted from said primary data signal;

receiving and decoding said index signal at said plurality of receivers;
determining and selecting, at each said receiver, those primary data packets in said primary data signal that are intended for said receiver based on address information in said index data signal; and
extracting and decoding the selected primary data packets in said primary data signal at said plurality of receivers.

2. The method of claim 1 wherein the index signal is transmitted at the same rate as the primary data signal.

3. The method of claim 1 where each receiver demodulates and decodes the index data signal in real-time.

4. The method of claim 1 wherein the primary data signal is temporarily buffered by a receiver for later demodulation and decoding.

5. The method of claim 1 wherein the index signal includes a plurality of packets, each packet in said index signal including an identification field containing information for identifying a particular receiver and a packet identification field for identifying corresponding packets in said primary data signal.

6. The method of claim 1 wherein the packets in the index signal correspond to the packets in the primary data signal.

7. A method of transmitting data in a digital communication system between a transmitting station and a plurality of receivers, said transmitting method comprising:
transmitting a primary data signal from said transmitting station to a relay station, wherein said primary data signal contains a plurality of primary data packets, each said primary data packet intended for a specific one of said receivers;
extracting a plurality of index data packets from said primary data signal at said relay station, wherein each said index data packet corresponds to a respective one of said primary data packets and contains address information addressing a specific one of said receivers;
re-transmitting said primary data signal from said relay station to said plurality of receivers over a broadband channel;
transmitting an index signal from said relay station to said plurality of receivers over a narrow band channel, wherein said index signal contains said plurality of index data packets extracted from said primary data signal for selecting said primary data packets in said primary data signal;
receiving and decoding said index signal at said plurality of receivers;
determining and selecting, at each said receiver, those primary data packets in said primary data signal that are intended for said receiver based on address information in said index data signal;
extracting and decoding the selected primary data packets in said primary data signal at said plurality of receivers.

8. The method of claim 7 where the primary data signal is transmitted at a rate of variable bit rates from 2 Mbps to 64 Mbps.

9. The method of claim 7 wherein the index signal is transmitted at the same rate as the primary data signal.

10. The method of claim 7 wherein receiving and decoding said index signal at said plurality of receivers is done in real-time.

11. The method of claim 7 further comprising the step of temporarily buffering the primary data signal prior to its demodulation and decoding.

12. The method of claim 7 wherein the index signal includes a plurality of packets, each packet in said index signal including an identification field containing information for identifying a particular receiver and a packet identification field for identifying corresponding packet(s) start time in said primary data signal.

13. The method of claim 7 wherein the packets in the index signal correspond to the packets in the primary data signal.

14. A broadband communications system comprising:
a relay station including:
receiving means for receiving a broadband primary data signal;
first transmitting means for transmitting said broadband primary data signal to a plurality of receivers, wherein said broadband signal includes a plurality of data packets each addressed to a selected receiver; and
a second transmitting means for transmitting a narrow band index signal extracted from said primary data signal, said index signal including addressing information for identifying the location of data packets in said broadband signal intended for a selected receiver and the start time of those packet(s); and
the plurality of receivers for receiving said primary data signal and said index signal, each receiver including:
a first signal processing means for demodulating and decoding said index signal to extract said addressing information;
a second signal processing means for demodulating and decoding said primary data signal; and
control means for selectively activating said second signal processing means based on addressing information in said index signal.

15. The communication system of claim 14 wherein each said receiver further includes an input buffer for temporarily storing said received primary data signal before demodulating and decoding portions of said primary data signal.

16. A receiver for a broadband communication system comprising:
a continuously operative input stream operative to demodulate and decode a received narrow band index signal;
a second input stream selectively operative to demodulate and decode portions of a received broadband primary data signal; and
a controller in said first input stream operative to monitor said narrow band index signal and, upon detection of addressing information that matches a predetermined address associated with said receiver, to enable said second input stream to capture and extract data associated with said addressing information from said broadband primary data signal, without tuning said second input stream to a different frequency.

17. The receiver of claim 16 further comprising an input buffer in said second input stream operative to temporarily store a portion of said received broadband primary data signal before demodulating and decoding portions of said received broadband primary data signal in response to said controller.

18. A relay station, interposed between a broadcast service provider and a subscriber, said relay station extracting an index signal from a primary broadband signal, said index signal containing an address and program time related information for the subscriber, and said relay station relaying said index signal to the subscriber on a narrow band signal, and transmitting primary information to the subscriber on a broadband channel.

19. The receiver of claim 17 wherein said controller accesses packet start time information in said received narrow band index signal, and enables said buffer via said packet start time information to capture said data.

20. A ground-based receiver for a satellite communication system, comprising:
   a first input stream operative to receive from a satellite, and demodulate and decode, a narrowband index data signal comprising only data packet header information including packet addresses, and to match addresses in said header information with a predetermined address unique to said receiver;
   a second input stream operative to receive from the satellite, and buffer, demodulate and decode selective portions of, a broadband primary data signal comprising complete data packets addressed to a plurality of receivers; and
   a controller in said first input stream operative to enable the second input stream to buffer a portion of said broadband primary data signal upon matching said receiver's unique address to a data packet address in said narrowband index signal.

21. The receiver of claim 19 wherein said data packet header information in said narrowband index data signal additionally comprises packet start time information, and wherein said controller uses said packet start time to enable the second input stream to buffer said portion of said broadband primary data signal.

22. The receiver of claim 20 wherein said data packet header information in said narrowband index data signal comprises 21 bits.

23. The receiver of claim 21 wherein the first 13 bits of said data packet header information contains the address of a receiver and the next 8 bits contain the packet start time for the corresponding data packed in said broadband primary data signal.

24. A method of receiving packet data addressed to a particular receiver, comprising:
   receiving and continuously demodulating and decoding in a first receiver path a narrowband index signal comprising only data packet header information including target receiver addresses, and comparing said addresses to a predetermined address unique to said particular receiver;
   intermittently receiving, buffering, demodulating and decoding in a second receiver path portions of a broadband primary data signal comprising complete data packets addressed to a plurality of receivers; and
   in response to matching a target receiver address in said narrowband index signal with said predetermined address unique to said particular receiver, enabling said second receiver path to obtain a complete data packet corresponding to the matched target receiver address, without retuning said second receiver path.

25. The method of claim 23 further comprising extracting packet start time information from said data packet header information in said narrowband index signal, and using said start time information to enable said second receiver path at a time effective to capture said complete data packet.

26. A method of receiving data packets addressed to a particular receiver, comprising:
   monitoring a narrowband broadcast signal containing only packet addresses and packet start times;
   detecting a match between a packet address and a unique receiver address; and
   after detecting said address match, using an associated start time to transiently receive a portion of a broadband broadcast signal containing complete data packets, for only a duration sufficient to capture the data packet having the matching packet address.

* * * * *